Nov. 2, 1948.    H. B. CONANT    2,452,551
RECTIFIER TYPE MEASURING INSTRUMENT
Filed April 27, 1945
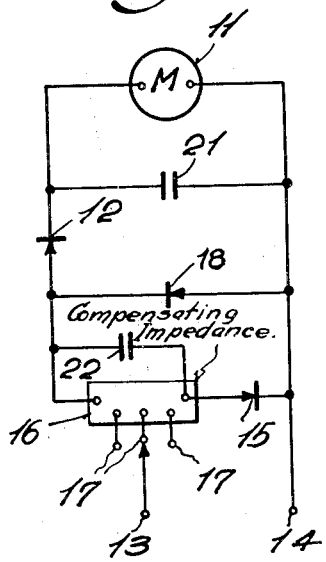
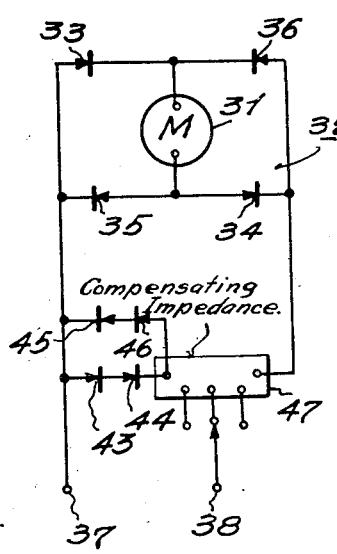
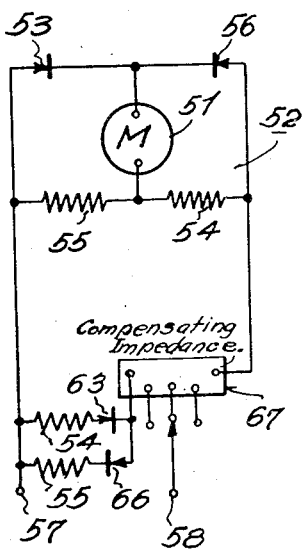
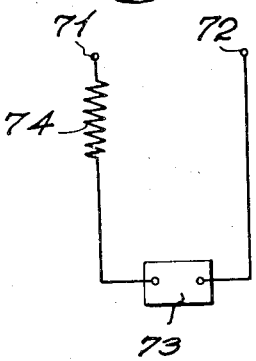
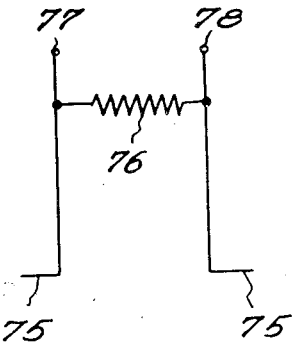
Inventor
Harold B. Conant,
By Strauch & Hoffman
Attorney Patented Nov. 2, 1948

2,452,551

UNITED STATES PATENT OFFICE 2,452,551

RECTIFIER TYPE MEASURING INSTRUMENT

Harold B. Conant, Lincoln, Nebr.

Application April 27, 1945, Serial No. 590,607

6 Claims. (Cl. 171—95)

This invention relates generally to apparatus for measuring alternating-current quantities and particularly concerns the compensation of rectifier type measuring circuits.

It is well established that the accuracy of rectifier type instruments is affected by errors due to the temperature-resistivity and the current density-resistivity characteristics of the rectifiers, as well as the frequency error of the inductively wound meter and the rectifiers.

Heretofore various corrective measures have been practiced, but these have been only partially effective and usually require the use of different scales on the meter for different types of readings due to the non-linear characteristics of the rectifiers and the meter. The frequency error in rectifier type instruments has been attributed largely to capacity effects in the rectifier. However, I have found that the frequency error is mainly due to variations in the impedance of the meter itself due to the pulsating direct current delivered by the rectifier. Since the frequency of this pulsating current varies according to the frequency of the alternating current being measured, the effective impedance of the meter depends upon the frequency being measured.

A major object of this invention is to provide improved compensating circuits for increasing the accuracy of rectifier type measuring instruments.

An important object of the invention is to correct variable characteristics of the rectifiers in this type of measuring instrument by a compensating circuit including a rectifier having substantially the same characteristics as that connected to the meter.

Another object of the invention is to provide a compensating circuit in which a compensating impedance for the meter is subjected to substantially the same electrical condition as the meter.

A further object of the invention is to compensate for frequency error due to the variable impedance characteristics of the meter as well as those of the rectifier circuit.

A still further object of the invention is to improve the accuracy of rectifier type meters by reducing errors due to high-frequency components from the energy source to which the meter is connected.

Further objects and advantages of the invention will become apparent from the following specification taken in connection with the accompanying drawings, wherein:

Fig. 1 is a schematic wiring diagram of an elementary form of rectifier type meter circuit with a compensating circuit connected thereto in accordance with the invention;

Fig. 2 is a schematic wiring diagram of a standard bridge type rectifier meter circuit and a compensating circuit therefor;

Fig. 3 is a standard full-wave semi-bridge rectifier meter circuit with a compensating circuit therefor;

Fig. 4 shows the manner in which the terminals of the meter circuits in Figs. 1 to 3 may be connected to a source of alternating-current energy for measuring the voltage thereof, and Fig. 5 shows the arrangement of terminal connections for measuring the current through an alternating-current conductor where the meter circuits of Figs. 1 to 3 are used as ammeters.

According to the invention, the compensating circuit for the rectifier type meter includes a rectifier connected in parallel with the meter circuit and having substantially the same characteristics as the rectifier in the meter circuit. The compensating circuit may also include an impedance having substantially the same characteristics as those of the meter itself. Thus, the compensating circuit may include a single rectifier in the case of an elementary rectifier meter circuit, or a bridge or full-wave rectifier in the case of other standard meter circuits, such as will be hereinafter more fully described. With these arrangements, variations in meter readings due to non-linear characteristics of the rectifiers and/or the meter will be exactly compensated by substantially identical variations in the characteristics of the compensating circuit. It may be said, therefore, that the compensating circuit is substantially an equivalent circuit to that of the rectifier meter and is connected in parallel therewith. With this arrangement, the compensating impedance is subjected to substantially the same electrical conditions as the meter.

Should other errors be introduced by current limitations due to the high impedance of the meter when used for measuring high-frequency quantities, the currents through the rectifiers may be increased by connecting a by-pass condenser in shunt with the meter. In this case, a similar by-pass condenser in the compensating circuit will maintain the equivalence between the meter circuit and the compensating circuit.

In the case of an elementary half-wave rectifier type meter circuit, errors due to the inverse current passed by some types of rectifiers may be substantially eliminated by arranging a reversely connected rectifier as well as a compensating circuit in parallel with the meter circuit.

Referring now to Fig. 1, there is shown a galvanometer 11 connected in series with a rectifier element 12. When this meter circuit has its terminals 13 and 14 connected to a source of alternating-current energy, the alternating current will be rectified by the rectifier 12 and the resulting unidirectional current measured by the galvanometer or other type of direct-current meter 11. In accordance with the invention, errors in readings of the meter 11 are compensated by connecting a rectifier 15 across the terminals 13 and 14 and in parallel with the meter circuit. By selecting the rectifier 15 to have substantially the same characteristics as the characteristics of the rectifier 12 in the meter circuit, substantially all errors in the readings of the meter 11 due to non-linear characteristics of the rectifier 12 will be compensated.

Additional compensation may be provided by connecting an impedance 16 in series with the compensating rectifier 15. The compensating impedance 16 should be selected to have substantially the same electrical characteristics as those of the meter 11. This impedance should particularly have, first, the same impedance to alternating currents of varying frequencies; second, the same direct-current resistance, and, third, the same temperature-resistivity coefficients.

It is desirable to provide taps 17 on the compensating impedance 16 so that the terminal 13 of the meter circuit may be connected to different taps for introducing different values of the impedance into the circuit. Where such taps are provided on the compensating impedance, it may be necessary to have this impedance composed of separate inductive and non-inductive units. Any well-known conventional units of this type may be selected. It is important, however, that the compensating impedance have substantially the same characteristics as those of the meter 11.

It will be apparent that the rectifier 15 and the impedance 16 form a series circuit which is substantially equivalent to the series circuit of the rectifier 12 and the meter 11. Since these two series circuits are connected in parallel, compensation is provided for variations in the meter readings due to non-linear characteristics of the meter circuit.

In this elementary rectifier type meter circuit, errors are sometimes introduced by the inverse current passed by the rectifier 12. This is particularly true when this rectifier is of the copper oxide type. It should be understood, however, that any suitable type of rectifier may be incorporated in the meter circuit as well as the compensating circuit. If the inverse current characteristic of the rectifier 12 produces errors in the meter's reading, the meter circuit may be shunted by a rectifier 18 connected in parallel with the meter circuit and the compensating circuit across the terminals 13 and 14. This rectifier is connected to pass current in the opposite direction to the direction in which current is passed by the rectifiers 12 and 15. In this manner, the rectifier 18 acts as a by-pass for substantially all of the inverse current.

Where the alternating-current energy to be measured is of a very high frequency, the impedance of the galvanometer 11 may be raised so high that the current drawn through the rectifier 12 is too low to operate the rectifier efficiently. In this case, the current drawn through the rectifier 12 may be increased by shunting a by-pass condenser 21 across the galvanometer 11 so that the high-frequency components are by-passed and, regardless of the frequency, sufficient current is drawn through the rectifier 12. As the value of the compensating impedance 16 will vary in the same manner as that of the galvanometer 11, a by-pass condenser 22 may also be shunted across the compensating impedance 16. It will be apparent, therefore, that high-frequency currents of sufficient magnitude will be drawn through the rectifiers 12 and 15 to operate them efficiently. Furthermore, the insertion of by-pass condensers 21 and 22 in the meter circuit and the compensating circuit, respectively, maintains the equivalence of these two circuits so that all variable characteristics of the meter circuit are compensated by corresponding variations in the characteristics of the compensating circuit.

In Fig. 2, the invention is shown as applied to a meter circuit in which a direct-current responsive meter or a galvanometer 31 is connected across one diagonal of a standard rectifier bridge, designated generally at 32. This rectifier bridge includes four rectifiers 33, 34, 35 and 36 arranged in a conventional balanced circuit and having their other diagonal connected to terminals 37 and 38. The rectifier bridge 32 acts as a full-wave rectifier to supply unidirectional current through the galvanometer 31 when the terminals 37 and 38 are connected to a source of alternating-current energy.

As in the case of the elementary rectifier type meter circuit shown in Fig. 1, the standard bridge type rectifier meter circuit shown in Fig. 2 is provided with a compensating circuit connected in parallel across the terminals 37 and 38. This compensating circuit is composed of rectifiers 43, 44, 45 and 46 corresponding to the rectifiers 33, 34, 35 and 36 and arranged in pairs to provide two legs of a parallel circuit which is connected in series with a compensating impedance 47 having characteristics corresponding to those of the meter 31. As will be apparent from an inspection of Fig. 2, for a given polarity of voltage applied to the terminals 37 and 38, current will flow through the meter 31 by way of rectifiers 33 and 34. For the same polarity of voltage applied to the terminals 37 and 38, current will flow through rectifiers 43 and 44, on one leg of the compensating circuit, and the compensating impedance 47. When the polarity of the applied voltage is reversed, the current through the meter and compensating circuits will flow through the other two pairs of rectifiers 35 and 36, and 45 and 46, respectively.

With this arrangement of the rectifiers and the compensating impedance in the compensating circuit, all variations in the characteristics of the standard bridge rectifier circuit 32 and the meter 31 will be compensated by corresponding changes in the characteristics of the rectifiers and the impedance in the compensating circuit. As in the case of the elementary type circuit of Fig. 1, the various elements of the compensating circuit should be substantially identical to the corresponding elements in the meter circuit. Since the compensating circuit is subjected to substantially the same electrical conditions as the meter circuit, effects of non-linear characteristics will be greatly reduced.

Fig. 3 shows the invention as applied to a standard full-wave rectifier type meter circuit. In this type of circuit, a meter 51 is connected across a diagonal of a balanced bridge designated generally at 52 and composed of rectifiers 53 and 56 providing full-wave rectification and voltage dividing resistors 54 and 55. This balanced bridge is provided with input terminals 57 and 58 and functions in a similar manner to the standard rectifier bridge shown in Fig. 2 except that the rectifiers 34 and 35 are replaced by resistors 54 and 55, respectively.

The compensating circuit for this arrangement includes rectifiers 63 and 66 arranged for full-wave rectification and connected to compensating impedance 67. The rectifiers 63 and 66 should be substantially identical to the rectifiers 53 and 56, and the characteristics of the compensating impedance 67 should be substantially the same as corresponding characteristics of the meter 51. Resistors 64 and 65, preferably identical to the resistors 54 and 55, are connected in series with the rectifiers 63 and 66, respectively, to complete the compensating circuit. Thus, the compensating circuit is substantially equivalent to the balanced bridge meter circuit, so compensation is provided for all variable conditions.

For purposes of simplicity, by-pass condensers have not been included in Figs. 2 and 3. It should be understood, however, that in the case of high-frequency measurements, these circuits may be provided with equivalent by-pass condensers connected across the meter and the compensating impedance.

Although I have shown my invention applied to three types of rectifier meter circuits, it is contemplated that it is equally as applicable to all types of such circuits. It may be used for measuring alternating voltages by connecting the input terminals of any of the three described circuits to terminals 71 and 72 (Fig. 4) so that the voltage of a source 73 to be measured is supplied through a multiplying resistance or impedance 74. The value of the multiplying impedance is, of course, selected to provide an appropriate proportionality factor for the meter. The voltage of terminals 71 and 72 is applied directly across the meter and compensating circuits.

In Fig. 5, there is shown an arrangement for measuring current in an electrical conductor 75. For this purpose, a shunt 76 is connected across terminals 77 and 78. The shunt 76 is connected into the line 75 and the current in the line is measured by determining the voltage drop across the known impedance 76. When the rectifier meter circuit is to be used as an ammeter, its input terminals may be connected to the terminals 77 and 78, in which case the deflection of the meter will provide a measure of the current in the conductor 75.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for measuring alternating-current quantities comprising a current responsive measuring unit having terminals for connection to an alternating-current source with a direct-current responsive meter and a first rectifier connected in series between said terminals, a second rectifier connected between said terminals in parallel with said measuring unit to pass current in the same direction as said first rectifier for compensating readings of said meter for variable characteristics of said first rectifier, and a third rectifier also connected between said terminals in parallel with said measuring unit to pass current in a direction opposite to that passed by said first rectifier for by-passing substantially all of the inverse current around said meter.

2. Apparatus for measuring alternating-current quantities comprising a current responsive measuring unit having terminals for connection to an alternating-current source with a direct-current responsive meter and a first rectifier connected in series between said terminals, a compensating circuit connected in parallel with said unit including a series-connected impedance and rectifier forming a circuit substantially equivalent to said unit for passing current in the same direction as said unit to compensate readings of said meter for variations in the characteristics of both said meter and the rectifier in said unit, and a third rectifier also connected between said terminals in parallel with said unit to pass current in a direction opposite to that passed by said first rectifier for by-passing substantially all of the inverse current around said meter.

3. Apparatus for measuring alternating-current quantities comprising a current responsive measuring unit consisting of a first rectifier bridge having a current responsive instrument connected across one diagonal, the other diagonal being adapted to be connected to a source of energy to be measured, and a compensating circuit including a second rectifier bridge connected across said other diagonal of the first rectifier bridge and having substantially the same characteristics as said first rectifier bridge to compensate readings of said meter for variations in the characteristics of said first rectifier bridge.

4. Apparatus for measuring alternating-current quantities comprising a current responsive measuring unit consisting of a first rectifier bridge having a current responsive instrument connected across one diagonal, the other diagonal being adapted to be connected to a source of energy to be measured, and a compensating circuit connected across said other diagonal of said first rectifier bridge including an impedance having substantially the same characteristics as said instrument connected in series with a second rectifier bridge having substantially the same characteristics as said first rectifier bridge.

5. Apparatus for measuring alternating-current quantities comprising a current responsive measuring unit having a direct-current meter and a first full-wave rectifier arranged in a balanced circuit adapted to be connected to a source of energy to be measured, and a compensating circuit including a second full-wave rectifier having substantially the same characteristics as said first full-wave rectifier, said second full-wave rectifier being connected across said balanced circuit to compensate readings of said meter for variations in characteristics of said first full-wave rectifier.

6. Apparatus for measuring alternating-current quantities comprising a current responsive measuring unit having a direct-current responsive meter and a first full-wave rectifier arranged in a balanced circuit adapted to be connected to a source of energy to be measured, and a compensating circuit including an impedance having substantially the same characteristics as said meter series-connected with a second full-wave rectifier having substantially the same characteristics as said first full-wave rectifier, said compensating circuit being connected in parallel with said unit to compensate readings of said meter for variations in the characteristics of both said meter and said first full-wave rectifier.

HAROLD B. CONANT.

REFERENCES CITED

The following references are of record in the file of this patent:

UNITED STATES PATENTS

| Number | Name | Date |
|---|---|---|
| 1,836,934 | Morecroft | Dec. 15, 1931 |
| 1,895,812 | Morecroft | Jan. 31, 1933 |
| 2,079,485 | Bousman | May 4, 1937 |
| 2,160,712 | Barnhart | May 30, 1939 |
| 2,249,452 | Boekels | July 15, 1941 |
| 2,368,351 | Ewen | Jan. 30, 1945 |

FOREIGN PATENTS

| Number | Country | Date |
|---|---|---|
| 404,498 | Great Britain | Jan. 18, 1934 |